United States Patent [19]

Crooks

[11] Patent Number: 5,373,117
[45] Date of Patent: Dec. 13, 1994

[54] METHOD FOR REDUCING ERRORS IN A DIGITIZER

[75] Inventor: John F. Crooks, Duluth, Ga.
[73] Assignee: NCR Corporation, Dayton, Ohio
[21] Appl. No.: 926,427
[22] Filed: Aug. 10, 1992
[51] Int. Cl.$^5$ ............................................ G08C 21/00
[52] U.S. Cl. ........................................ 178/18; 178/19
[58] Field of Search ................................ 178/18, 19
[56] References Cited

U.S. PATENT DOCUMENTS

| | | |
|---|---|---|
| 3,567,859 | 3/1971 | Ellis et al. . |
| 3,624,293 | 11/1971 | Baxter . |
| 3,798,370 | 3/1974 | Hurst . |
| 4,255,617 | 3/1981 | Carau, Sr. et al. ............ 178/19 |
| 4,564,079 | 1/1986 | Moore et al. . |
| 4,686,331 | 8/1987 | Burgess ........................... 178/19 |
| 4,728,944 | 3/1988 | Tamaru et al. . |
| 4,734,685 | 3/1988 | Watanabe . |
| 4,809,195 | 2/1989 | Bechet . |
| 4,853,493 | 8/1989 | Schlosser et al. . |
| 4,886,943 | 12/1989 | Suzuki et al. . |
| 4,931,965 | 6/1990 | Kaneko et al. . |
| 5,005,205 | 4/1991 | Ellozy et al. . |
| 5,040,222 | 8/1991 | Muroya . |
| 5,229,551 | 7/1993 | McDermott et al. ............ 178/18 |

Primary Examiner—Stephen Chin
Assistant Examiner—Paul Loomis
Attorney, Agent, or Firm—Albert L. Sessler, Jr.

[57] ABSTRACT

A method for reducing errors in electrographic digitizer systems where the horizontal and vertical coordinates are quantized at various time intervals. The method minimizes the time skew generated during quantizations and doubles the quantized coordinate pair output rate by utilizing a time-weighted linear interpolation.

5 Claims, 5 Drawing Sheets

FIG. 4
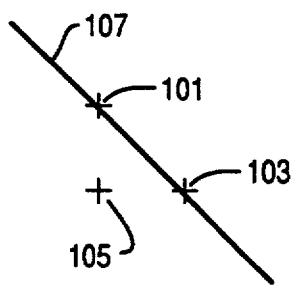
FIG. 5
| TIME: | ACTUAL POSITION: | DIGITIZER QUANTIZES: | DIGITIZER ASSUMES POINT: | ERROR IN X: |
|---|---|---|---|---|
| $t_0$ | $X_0, Y_0$ | $X_0$ | – | – |
| $t_1$ | $X_1, Y_1$ | $Y_1$ | $X_0, Y_1$ | $(X_1 - X_0)$ |
FIG. 6
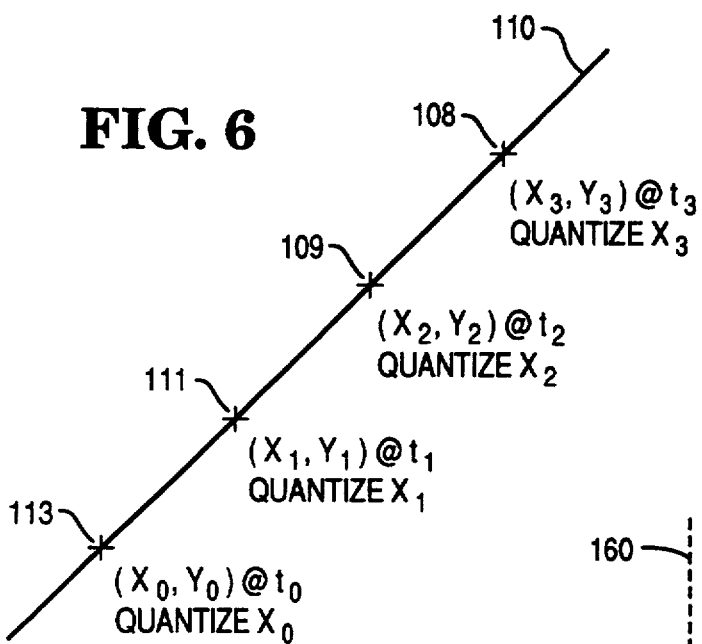
FIG. 7
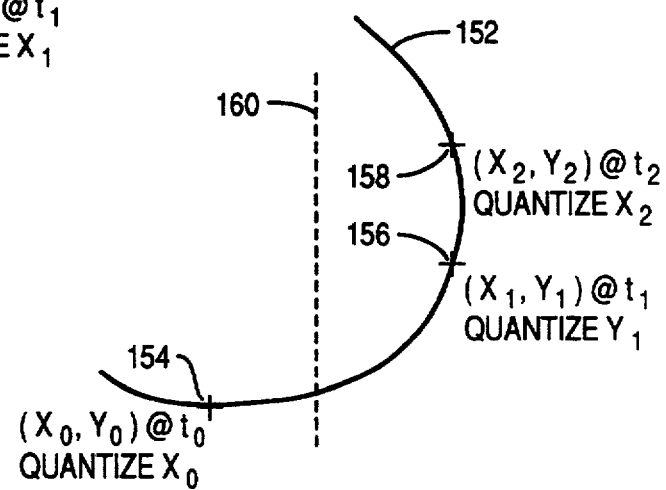

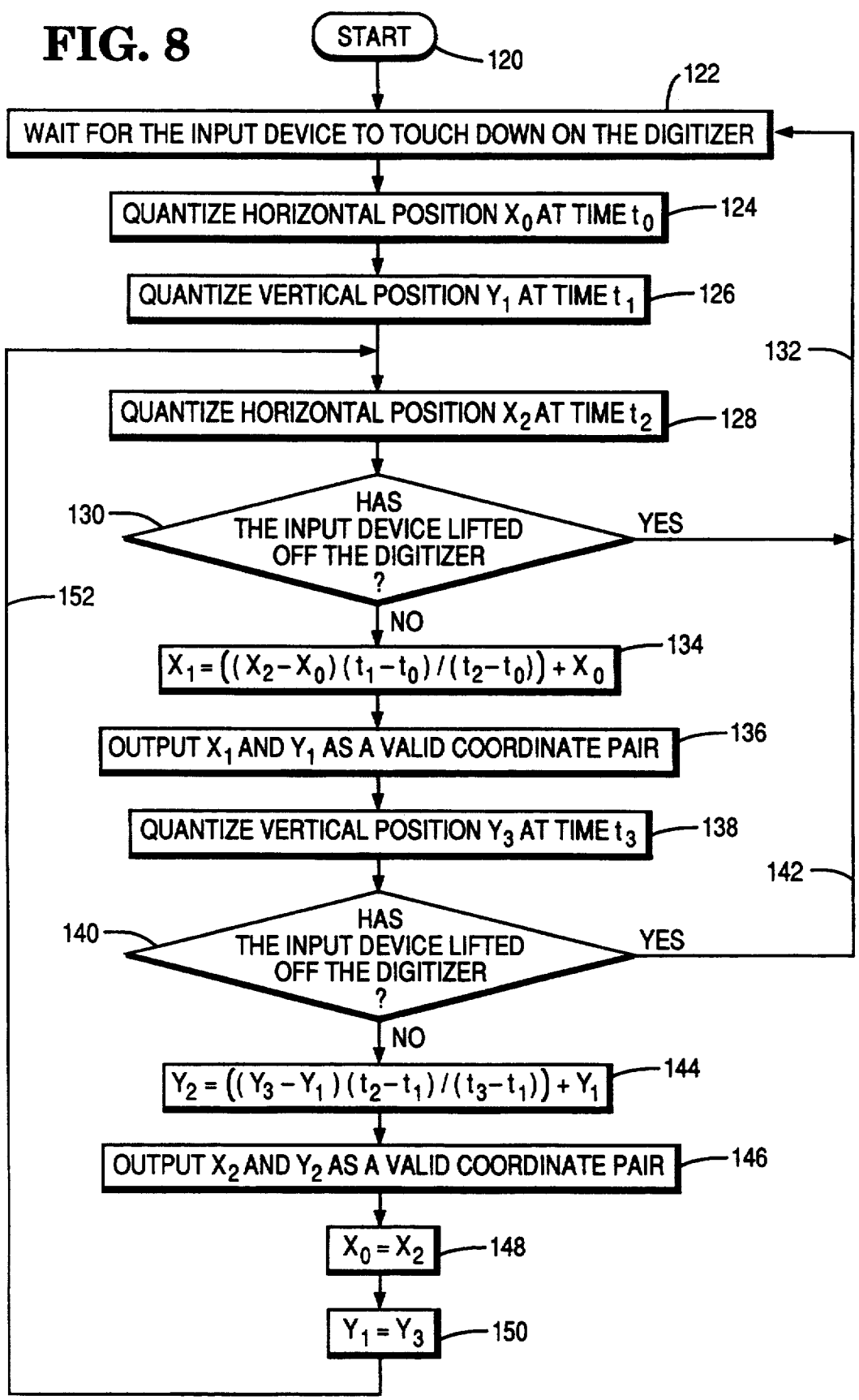

METHOD FOR REDUCING ERRORS IN A DIGITIZER

BACKGROUND OF THE INVENTION

The present invention relates to a method for reducing errors in a digitizer, and more particularly relates to a method for reducing errors in electrographic digitizer systems in which horizontal and vertical coordinates are quantized at various time intervals. The present invention is particularly applicable to digitizers used to capture handwriting input.

In most digitizers, horizontal and vertical positions are quantized separately at discrete time intervals. If the input device, be it a stylus or a finger, is in motion during the period between quantizations, a certain amount of "coordinate time skew" can result. This is, of course, undesirable, since it results in error in recording and reproducing the handwritten information, such as a drawn line.

Digitizers in which horizontal and vertical coordinates are quantized at separate time intervals are common in the prior art, as typified in U.S. Pat. Nos. 3,567,859, inventor Ellis; 3,624,293, inventor Baxter; 3,798,370, inventor Hurst; 4,564,079 inventors Moore et al., and 4,853,493, inventors Schlosser et al.

SUMMARY OF THE INVENTION

In the method of the present invention, the time skew generated during quantizations of a trace made using an electrographic digitizer system is minimized by utilizing a time-weighted linear interpolation. This method also doubles the quantized coordinate pair output rate.

In accordance with another aspect of the present invention, a process for providing coordinate data representing a trace made on a digitizing device, comprises the following steps: (a) making a trace on a digitizing device; (b) sampling the trace as it is made to obtain horizontal (x) and vertical (y) point values at observed time (t); c) interpolating pairs of adjacent observed (x) point values to obtain an interpolated (x) point value to be associated with an observed (y) point value, said interpolated (x) point value being determined by multiplying the distance between the adjacent observed (x) point values by the ratio of the difference in times (t) between the first observed (x) point value and the observed (y) point value to the difference in times (t) between the two observed (x) point values; and (d) interpolating pairs of adjacent observed (y) point values to obtain an interpolated (y) point value to be associated with an observed (x) point value, said interpolated (y) point value being determined by multiplying the distance between the adjacent observed (y) point values by the ratio of the difference in times (t) between the first observed (y) point value and the observed (x) point value to the difference in times (t) between the two observed (y) point values.

In accordance with another aspect of the present invention, a process for providing coordinate data representing a trace made on a digitizing device, comprises the following steps: (a) making a trace on a digitizing device; (b) sampling the trace as it is made to obtain horizontal (x) and vertical (y) point values; (c) quantizing a horizontal position ($x_0$) at time ($t_0$); (d) quantizing a vertical position ($y_1$) at time ($t_1$); (e) quantizing a horizontal position ($X_2$) at time ($t_2$); (f) if the trace has terminated, waiting until another trace is begun, as in step (a); (g) if the trace has not terminated, solving for a value ($x_i$) in accordance with following expression: $x_1=((x_2-x_0)(t_1-t_0)/(t_2-t_0))+x_0$; (h) outputting ($x_1$) and ($y_1$) as a valid coordinate pair; quantizing vertical position ($y_3$) at time ($t_3$); (j) if the trace has terminated, waiting until another trace is begun, as in step (a); (k) if the trace has not terminated, solving for a value ($y_2$) in accordance with the following expression: $(y_2)=((y_3-y_1)(t_2-t_1)/(t_3-t_1)+y_1$; (1) outputting ($x_2$) and ($y_2$) as a valid coordinate pair; (m) setting ($x_0$)=($x_2$); (n) setting ($y_1$)=($y_3$); and (o) returning to step (c).

In accordance with another aspect of the present invention, a process for providing coordinate data representing a trace made on a digitizing device, comprises the following steps: (a) making a trace on a digitizing device; (b) sampling the trace at regular intervals as it is made to obtain horizontal (x) and vertical (y) point values; (c) quantizing a horizontal position ($x_0$) at time ($t_0$); (d) quantizing a vertical position ($y_1$) at time ($t_1$); (e) quantizing a horizontal position ($X_2$) at time ($t_2$); (f) if the trace has terminated, waiting until another trace is begun, as in step (a); (g) if the trace has not terminated, solving for a value ($x_1$) in accordance with the following expression: $x_1=(x_2+x_0)/2$; (h) outputting ($x_1$) and ($y_1$) as a valid coordinate pair; (i) quantizing vertical position ($y_3$) at time ($t_3$); (j) if the trace has terminated, waiting until another trace is begun, as in step (a); (k) if the trace has not terminated, solving for a value ($y_2$) in accordance with the following expression: $y_2=(y_3+y_1)/2$; (1) outputting ($x_2$) and ($y_2$) as a valid coordinate pair; (m) setting ($x_0$)=($x_2$); (n) setting ($y_1$)=($y_3$); and o) returning to step (c).

It is accordingly an object of the present invention to provide a process for reducing coordinate time skew in electrographic digitizer systems.

It is another object of the present invention to provide a process for reducing coordinate time skew in electrographic digitizer systems in which the horizontal and vertical coordinates are quantized at separate time intervals.

Another object of the present invention is to provide a process for reducing errors in reproducing a trace made on a digitizer.

Another object of the present invention is to provide a process for reducing coordinate time skew in connection with the use of a digitizer system utilizing a time-weighted linear interpolation of coordinate point data.

Another object of the present invention is to provide a process for reducing errors in connection with the generation of x and y values in representing points generated by sampling a trace made on an electrographic digitizer system by interpolating pairs of x values to be associated with an observed y value and interpolating pairs of y values to be associated with an observed x value.

Additional benefits and advantages of the present invention will become apparent to those skilled in the art to which this invention relates from the subsequent description of the preferred embodiments and the appended claims, taken in conjunction with the accompanying drawings.

BRIEF OF DESCRIPTION OF THE DRAWINGS

FIG. 4 is a diagram showing points quantized by a digitizer during drawing of a line.

FIG. 5 is a table showing various values associated with the quantizing of points by the digitizer in connection with the drawing of the line of FIG. 4.

FIG. 6 is a diagram showing points quantized by a digitizer during drawing of a line using the method of the present invention.

FIG. 7 is a diagram illustrating a "worst case" scenario of points quantized by a digitizer during drawing of a curved line using the method of the present invention.

FIG. 8 is a flow diagram of the method of the present invention for reducing time skew in quantizing of points by a digitizer.

DETAILED DESCRIPTION

The present invention may be implemented by use of a write input device which combines a display visible to a user with a digitizer or touch screen through which the entry of data by a user may be made.

Figure 1:
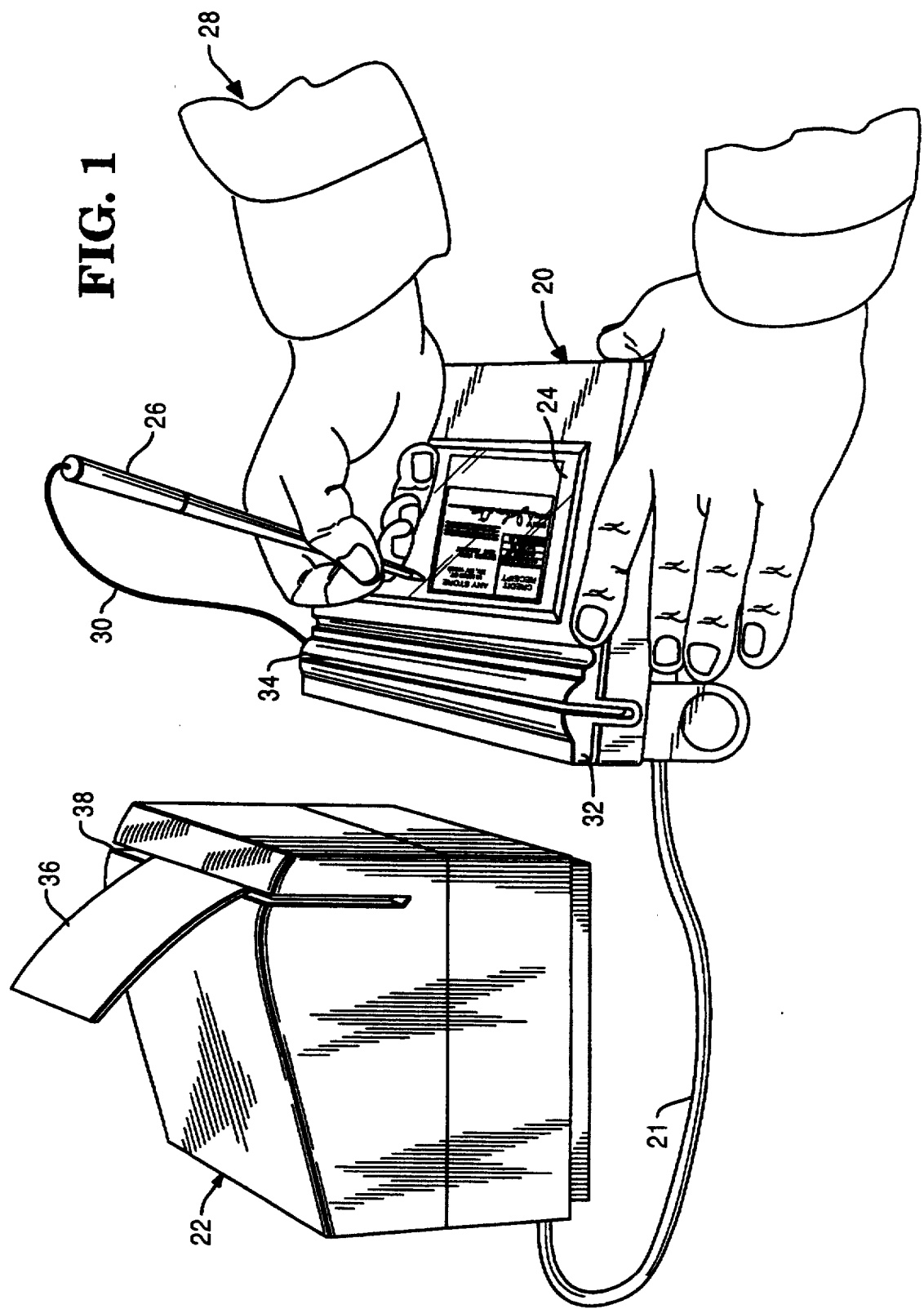
FIG. 1 is a perspective view of a write input apparatus and associated printer which may be employed in the present invention.

Referring now to FIG. 1, shown there is a perspective view of one type of a suitable write input apparatus 20 which is coupled to a printer 22 by a connector 21. Although this is shown as a direct connection or coupling, the actual coupling or connection may actually extend through one or more other devices, such as a controller, as will be subsequently be described. The write input device includes a transparent surface 24 through which information may be displayed and on which information may be entered by writing thereon with a stylus 26 by a human operator 28. The stylus 26 is connected to the apparatus by an electrically conductive line 30. The apparatus may also include an integral magnetic stripe reader 32 having a slot 34 through which a card bearing magnetic indicia may be swiped so that the data contained thereon can be inputted by, stored in and used by the system which includes the write input apparatus 20 and the printer 22. The write input device 20 can be configured without the magnetic stripe reader 32, if desired, in the event that the system which includes the apparatus does not require a reader, or incorporates a separate reader.

The printer 22 will most commonly be used for printing customer receipts such as the receipt 36 which is shown as issuing from an aperture 38 in the housing of the printer. Other types of record media could also be generated by the printer 22, if desired, in response to the needs of the system. Any suitable printer may be employed, such as an Epson RP265, made by Epson America, Inc., Torrance, Calif.

Figure 2:
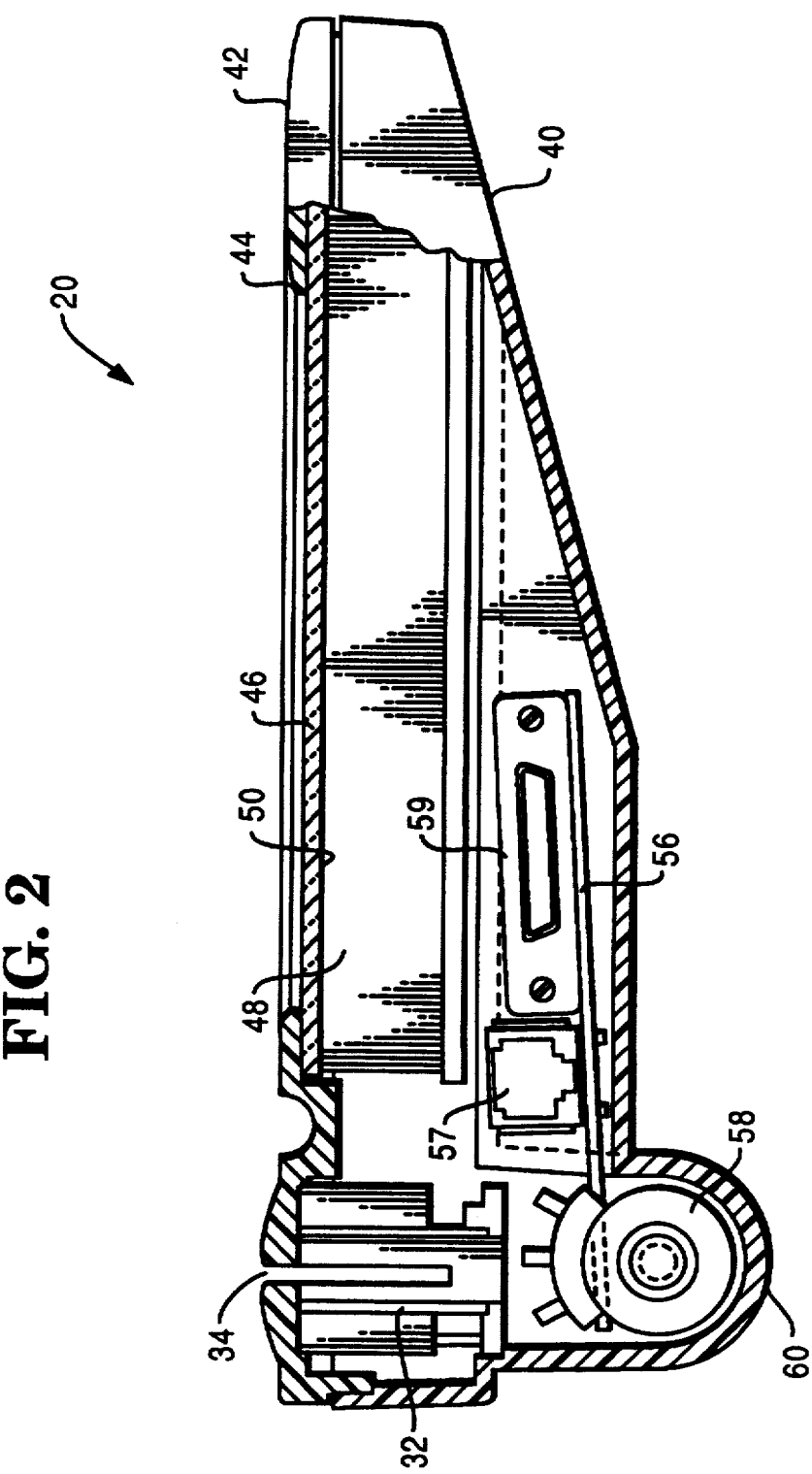
FIG. 2 is a sectional elevational view of the write input apparatus of FIG. 1.

As shown in the sectional view of FIG. 2, the write input apparatus 20 is contained within a lower housing 40 and an upper housing 42, which mate along the edges thereof. The upper housing contains an aperture 44 within which is placed a transparent interactive digitizer element 46 which is capable of generating electrical signals which represent the position of the stylus 26 or other device placed in contact therewith. Broadly speaking, during operation of the interactive element 46, the stylus 26 acts as a probe and the differing potentials between sides of the element, in two coordinate directions, are measured, converted into digital form, and processed through correction algorithms. This enables a trace of the movement of the stylus to be captured and retained, as well as displayed on a liquid crystal display (LCD) module 48. Interactive elements of this type are commercially available, and one such device which can be employed in the present invention is the Screenwriter controller/digitizer/pen marketed by MicroTouch Systems Inc., Wilmington, Mass.

Positioned directly beneath the interactive transparent element 46 and having a display screen visible therethrough is the liquid crystal display (LCD) module 48 which is capable of displaying information in response to electrical signals applied thereto. Information from a card that has been read by the magnetic stripe reader 32 can be used to enter information into the LCD module 48. Electrical signals from the interactive element 46 relating to movement of the stylus 26 on the element can then be applied to the LCD module 48 to provide a representation of a signature on a receipt form. Thus, since the LCD module 48 is positioned directly beneath the transparent digitizer element 46, the movements of the stylus 26 on the transparent surface 24 are graphically captured and are immediately visible at the points of contact of the stylus with the surface. A display screen 50 forms part of the top surface of the module. LCD modules of this type are commercially available, and one such module which can be employed in the present invention is Model EG7500, marketed by Epson America, Inc., Torrance, Calif.

Figure 3:
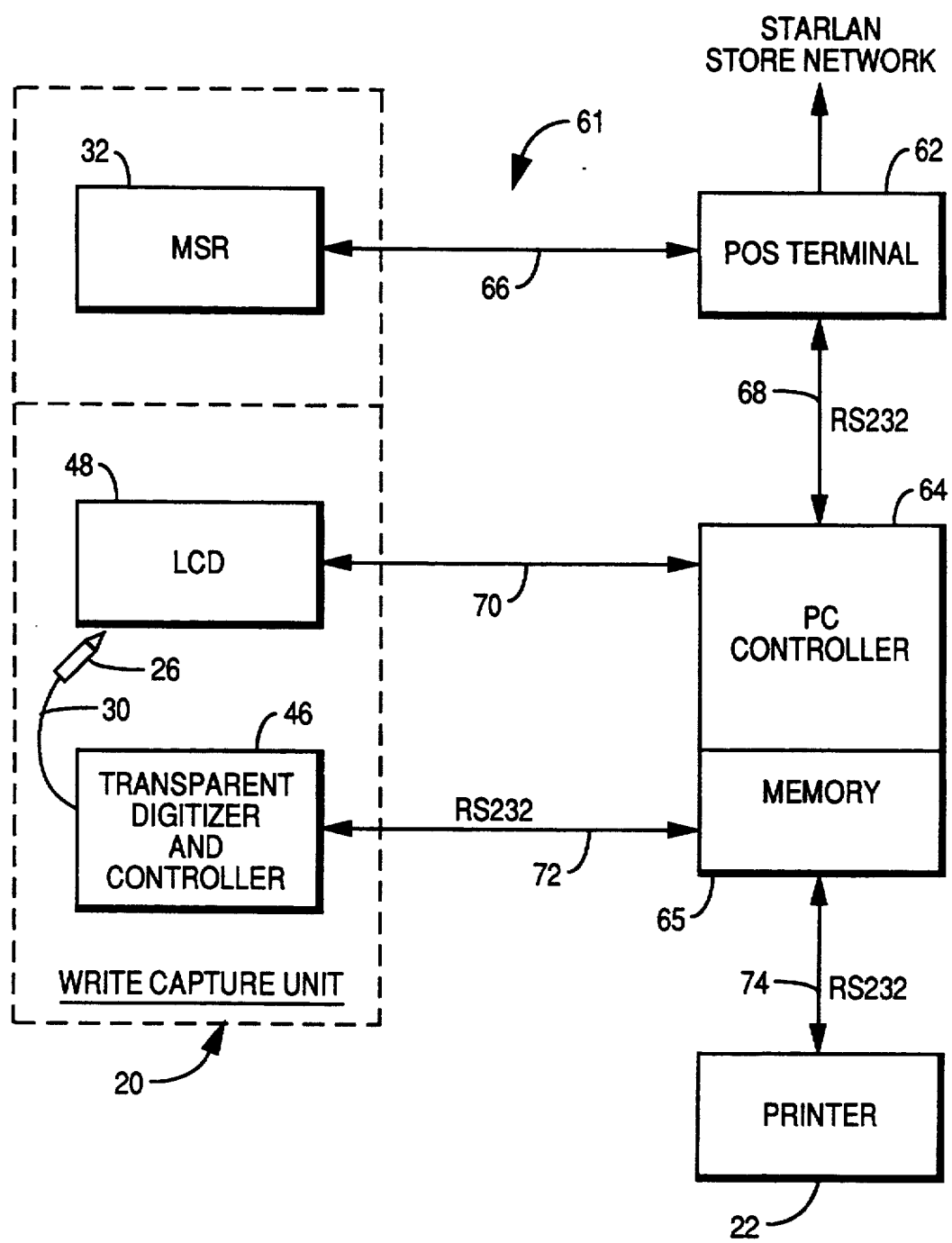
FIG. 3 is a block diagram of a system which includes the write input apparatus.

The magnetic stripe reader 32 and its slot 34 are shown to be located in the upper left portion of the apparatus 20, as viewed in FIG. 2. A control circuit board 56 which functions as a controller for the transparent digitizer element 46 is located below the LCD module 48 in the lower housing 40 of the apparatus 20 and includes a connector 57 for connection to the digitizer element 46 and also includes an RS232 connector 59 to a PC controller 64 (FIG. 3). A contrast control 58 for changing the contrast of the screen 50 of the LCD module 48 is located in a semi-cylindrical lower extension 60 of the lower housing 40, which extension also serves as a foot or support for supporting the apparatus on a work surface.

FIG. 3 is a block diagram of a system 61 which includes the write input apparatus 20 and the printer 22, in addition to the magnetic stripe reader 32, a point of sale (POS) terminal 62 and a personal computer functioning as a controller 64. The controller 64 contains a memory 65, which includes memory space for storing various information.

The write input apparatus 20 is shown in block form in phantom lines, and includes the LCD module 48 and the interactive digitizer element and controller 46, with associated stylus 26. The magnetic stripe reader 32 is shown in a separate phantom line block, to indicate that it may be a separate free-standing device, rather than being integrated into the housing of the write input apparatus 20, if desired. The POS terminal can be any suitable device of that type, such as a Class 7052 terminal, marketed by NCR Corporation, Dayton, Ohio. The personal computer 64 which functions as a controller may be any suitable personal computer, such as a Model PC 810, marketed by NCR Corporation, Dayton, Ohio. A Display Master model YDM6420 graphics adapter, marketed by Yamaha Corporation of America, San Jose, Calif., is incorporated into the controller 64, and functions to drive the LCD module 48. An NCR Corporation part number 017-0035367B RS 232 adaptor board adds required additional serial ports for communications.

The magnetic stripe reader 32 is connected via a path 66 to the POS terminal 62, which is in turn connected by an RS232 data bus 68 to the PC controller 64. The LCD display 48 is connected via a path 70 to the PC controller 64, and in effect takes the place of the CRT display which would normally be associated with the PC. The digitizer and controller 46 is connected to the PC controller 64 by an RS232 data bus 72, and a similar RS232 data bus 74 connect the PC controller 64 to the printer 22. The POS terminal 62 may be connected to other data processing facilities in an establishment in which it is used, such as a STARLAN store network.

For a more detailed description of the write input apparatus 20, reference may be had to U.S. patent application Ser. No. 575,096, filed Aug. 30, 1990, inventors David M. Allgeier et al., for "Write Input Transaction Apparatus and Method", assigned to the assignee of the present application, and incorporated herein by reference.

In most input devices, such as the write input apparatus 20, horizontal and vertical positions are quantized separately at discrete time intervals. If the digitizer input device, be it a stylus such as the stylus 26, or a finger, is in motion during the period between quantizations, a certain amount of "coordinate time skew" can result.

FIG. 4 illustrates this graphically. Assume that the digitizer input device follows a path 107 through the points 101 and 103. At time $t_0$, the digitizer input device is at location 101, at which point the digitizer quantizes the horizontal position. At time $t_1$, the input device is at location 103, at which point the digitizer quantizes the vertical position. Taking these two coordinate quantizations together, the digitizer assumes that the input device was at point 105, when in actuality it never was.

The table of FIG. 5 illustrates this more quantitatively. At time $t_0$, the input device is at position $(x_0, y_0)$ and the digitizer quantizes the coordinate $x_0$. Hereafter, the horizontal position will be referred to as "X" and the vertical position will be referred to as "Y". At time $t_1$, the input device is at position $(X_1, Y_1)$ and the digitizer quantizes the coordinate $Y_1$. The digitizer then assumes that at time $t_1$, the input device is at point $X_0$, $Y_1$ when in actuality it is at point $X_1$, $Y_1$. The error in X is then $(X_1 - X_0)$. This error can be significant if the input device is moving at high velocity relative to the quantization rate.

The present invention provides a method for reducing this time skew. As an added benefit, this method also effectively doubles the coordinate pair rate. FIG. 6 illustrates this new method. Assume that the digitizer input device follows a straight path 110 through points 113, 111, 109 and 108 at locations $(X_0, Y_0)$, $(X_1, Y_1)$, $(X_2, Y_2)$, and $(X_3, Y_3)$, respectively. Also assume that the digitizer quantizes coordinates $X_0$, $Y_1$, $X_2$ and $Y_3$ at times $t_0$, $t_1$, $t_2$ and $t_3$, respectively.

Suppose that it is desired to find coordinate pair $(X_1, Y_1)$. In order to do this, $X_1$ must be interpolated. Assuming that the input device is moving at a constant velocity along the path 110, $X_1 = ((X_2 - X_0)(t_1 - t_0)/(t_2 - t_0)) + X_0$. This is a valid approximation for most handwritten digitizer input if the periods $(t_1 - t_0)$ and $(t_2 - t_1)$ are small. Similarly, coordinate pair $(X_2, Y_2)$ can be found by interpolating $Y_2 = ((Y_3 - Y_1)(t_2 - t_1)/(t_3 - t_1)) + Y_1$. Note that there is a new coordinate pair for each quantization. This is twice the point rate of the old method illustrated in the table of FIG. 5.

A more detailed explanation of the method for reducing time skew is shown in the flow diagram of FIG. 8. From a "start" block 120, the process initially waits for the input device to touch down on the digitizer (block 122). When this takes place, a horizontal position $X_0$ is quantized at time $t_0$ (block 124). Following this, a vertical position $Y_1$ is quantized at time $t_1$ (block 126). Next, another horizontal position $X_2$ is quantized at time $t_2$ (block 128).

A determination is then made (block 130) as to whether the input device has lifted off the digitizer. If so, the process returns via path 132 to block 122 to wait for the input device to touch down again on the digitizer. If not, the interpolated point value $X_1$ is solved for in accordance with the equation found in block 134. The values $X_1$ and $Y_1$ are then output as a valid coordinate pair, as represented in block 136. Following this, a vertical position $Y_3$ is quantized at time $t_3$. A determination is then made in block 140 as to whether or not the input device has lifted off the digitizer. If so, the process returns via path 142 and path 132 to the block 122. If not, the interpolated point value $Y_2$ is solved for in accordance with the equation found in block 144. The values $X_2$ and $Y_2$ are then output as a valid coordinate pair, as represented in block 146. In block 148, $X_0$ is set equal to $X_2$ and in block 150, $Y_1$ is set equal to $Y_3$. The process then returns via path 152 to block 128, and will continue, using further points sampled from the path of the input device across the digitizer until the input device is lifted off the digitizer.

In the special case in which coordinates are quantized at regular intervals, the equations in blocks 134 and 144 can be simplified. In this case, $(t_0 - t_1) = (t_2 - t_1) = (t_3 - t_2) = T$, a constant. Through some algebraic manipulation, the equations in blocks 134 and 144 above become $X_1 = (X_2 + X_0)/2$ and $Y_2 = (Y_3 + Y_1)/2$. If coordinates are not quantized at regular intervals but processing power is at a premium, these simplified equations may be acceptable if performance is not as critical.

FIG. 7 illustrates a worst case scenario, in which the old method illustrated in the table of FIG. 5 could produce either more or less error than the method of the present invention. It can be shown that the new method has a better guaranteed worst case error than the old. Assume that the digitizer input device follows a path 152 in FIG. 7 through points 154, 156 and 158 at locations $(X_0, Y_0)$, $(X_1, Y_1)$ and $(X_2, Y_2)$, respectively. Also assume that the digitizer quantizes coordinates $X_0$, $Y_1$ and $X_2$ at times $t_0$, $t_1$ and $t_2$, respectively, and that $X_1 = X_2$.

If the digitizer were to use $X_2$ as the unknown $X_1$ in coordinate pair $(X_1, Y_1)$, error would be zero. This is a best case scenario, using the old method. If the digitizer were to use $X_0$ as the unknown $X_1$ in coordinate pair $(X_1, Y_1)$, the error would be $(X_1 - X_0)$. This is a worst case scenario using the old method. If a weighted average of $X_0$ and $X_2$, represented by line 160, is taken as prescribed in the method of the present invention, an error will be obtained which is somewhere between these extremes. This will always be an improvement over the worst case scenario using the old method.

While the forms of the invention shown and described herein are admirably adapted to fulfill the objects primarily stated, it is to be understood that it is not intended to confine the invention to the forms or embodiments disclosed herein, for it is susceptible of embodiment in various forms within the scope of the appended claims.

What is claimed is:

1. A process for providing coordinate data representing a trace made on a digitizing device, comprising the following steps:
   (a) making a trace on a digitizing device;
   (b) sampling the trace as it is made to obtain observed horizontal (x) and vertical (y) point values at observed times (t);
   (c) interpolating pairs of adjacent observed (x) point values to obtain an interpolated (x) point value to be associated with an observed (y) point value, said interpolated (x) point value being determined by multiplying the distance between the adjacent observed (x) point values by the ratio of the difference in times (t) between the first observed (x) point value and the observed (y) point value to the difference in times (t) between the two observed (x) point values; and
   (d) interpolating pairs of adjacent observed (y) point values to obtain an interpolated (y) point value to be associated with an observed (x) point value, said interpolated (y) point value being determined by multiplying the distance between the adjacent observed (y) point values by the ratio of the difference in times (t) between the first observed (y) point value and the observed (x) point value to the difference in times (t) between the two observed (y) point values.

2. The process of claim 1, in which the sampling of the trace provides alternating horizontal (x) and vertical (y) observed point values.

3. The process of claim 1, in which an interpolated value is provided for each observed value except the first and last of a trace.

4. A process for providing coordinate data representing a trace made on a digitizing device, comprising the following steps:
   (a) making a trace on a digitizing device;
   (b) sampling the trace as it is made to obtain horizontal (x) and vertical (y) point values;
   (c) quantizing a horizontal position $(x_0)$ at time $(t_0)$;
   (d) quantizing a vertical position $(Y_1)$ at time
   (e) quantizing a horizontal position $(X_2)$ at time $(t_2)$;
   (f) if the trace has terminated, waiting until another trace is begun, as in step (a);
   (g) if the trace has not terminated, solving for a value $(x_1)$ in accordance with the following expression:
   $x_1 = (x_2 - x_0)(t_1 - t_0) / (t_2 - t_0) + x_0$;
   (h) outputting $(x_1)$ and $(Y_1)$ as a valid coordinate pair;
   (i) quantizing vertical position $(Y_3)$ at time $(t_3)$;
   (j) if the trace has terminated, waiting until another trace is begun, as in step (a);
   (k) if the trace has not terminated, solving for a value $(Y_2)$ in accordance with the following expression:
   $(Y_2) = (Y_3 - Y_1)(t_2 - t_1) / (t_3 - t_1) + Y_1$;
   (l) outputting $(x_2)$ and $(Y_2)$ as a valid coordinate pair;
   (m) setting $(x_0) = (x_2)$;
   (n) setting $(y_1) = (y_3)$; and
   (o) returning to step (c).

5. A process for providing coordinate data representing a trace made on a digitizing device, comprising the following steps:
   (a) making a trace on a digitizing device;
   (b) sampling the trace at regular intervals as it is made to obtain horizontal (x) and vertical (y) point values;
   (c) quantizing a horizontal position $(x_0)$ at time $(t_O)$;
   (d) quantizing a vertical position $(Y_1)$ at time $(t_1)$;
   (e) quantizing a horizontal position $(X_2)$ at time $(t_2)$;
   (f) if the trace has terminated, waiting until another trace is begun, as in step (a);
   (g) if the trace has not terminated, solving for a value $(x_1)$ in accordance with the following expression:
   $x_1 = (x_2 + x_0)/2$;
   (h) outputting $(x_1)$ and $(y_1)$ as a valid coordinate pair;
   (i) quantizing vertical position $(Y_3)$ at time $(t_3)$;
   (j) if the trace has terminated, waiting until another trace is begun, as in step (a);
   (k) if the trace has not terminated, solving for a value $(Y_2)$ in accordance with the following expression:
   $y_2 = (y_3 + y_1)/2$;
   (1) outputting $(x_2)$ and $(Y_2)$ as a valid coordinate pair;
   (m) setting $(x_0) = (x_2)$;
   (n) setting $(y_1) = (y_3)$; and
   (o) returning to step (c).

* * * * *